United States Patent
De Gain

[15] 3,699,624
[45] Oct. 24, 1972

[54] STRETCH METHOD FOR MAKING A TUBULAR PRODUCT

[72] Inventor: William J. De Gain, Warren, Mich.

[73] Assignee: Koppy Corporation, Ferndale, Mich.

[22] Filed: Feb. 10, 1971

[21] Appl. No.: 114,107

Related U.S. Application Data

[60] Division of Ser. No. 824,440, May 14, 1969, Pat. No. 3,577,621, which is a continuation-in-part of Ser. No. 627,718, April 3, 1967, abandoned.

[52] U.S. Cl. ............29/155 C, 29/421, 29/454, 72/369, 92/34, 113/116 B, 138/173, 74/492
[51] Int. Cl. ............................................B23p 17/00
[58] Field of Search .........29/155 C, 454, 421, 163.5; 72/369; 113/116 B; 138/173; 74/492; 92/34, 47

[56] References Cited

UNITED STATES PATENTS

| | | |
|---|---|---|
| 1,614,563 | 1/1927 | Leach et al. ......113/116 B UX |
| 2,034,561 | 3/1936 | Davis...............113/116 B UX |
| 2,083,943 | 6/1937 | Clifford..................113/116 B |
| 2,371,991 | 3/1945 | Harding................29/454 UX |
| 2,927,953 | 3/1960 | Staller....................29/454 UX |
| 3,326,091 | 6/1967 | Allen........................29/454 X |
| 3,487,710 | 1/1970 | Fergle..........................74/492 |

Primary Examiner—Charlie T. Moon
Attorney—Hauke, Gifford and Patalidis

[57] ABSTRACT

A tubular metal blank to be formed into a vehicle steering column or other stress-subjectable corrugated tubular product is first deformed by radially inwardly moving dies or other forming devices to produce a plurality of substantially equally spaced shallow annular depressions separated by slightly raised crowns. The blank is then axially compressed to form and close a plurality of convolutions under a selected load within predetermined limits and to a selected closed length within predetermined limits, the variations being dependent on the strength of the material. Finally, the blank is stretched using a selected stretch pressure within predetermined limits and to a selected expanded length within predetermined limits, expanding the convolutions to a plurality of generally similar spaced corrugations. When the end product is used as an energy absorbing tube, the above method minimizes the variations from a selected compressive axial load which would be required to collapse the finished column.

9 Claims, 11 Drawing Figures

PATENTED OCT 24 1972 3,699,624

INVENTOR
WILLIAM J. DE GAIN
BY
Hauke, Gifford + Patalidi
ATTORNEYS

PATENTED OCT 24 1972　　　　　　　　　　3,699,624

CLOSE VARIATION DIAGRAM

STRETCH VARIATION DIAGRAM

INVENTOR
WILLIAM J. DE GAIN

BY Hauke, Gifford + Patalidis

ATTORNEYS

STRETCH METHOD FOR MAKING A TUBULAR PRODUCT

CROSS REFERENCE TO RELATED APPLICATIONS

The present application is a division of co-pending U.S. application Ser. No. 824,440, filed May 14, 1969, now U.S. Pat. No. 3,577,621 which is a continuation-in-part of U.S. application Ser. No. 627,718, filed Apr. 3, 1967, now abandoned.

BACKGROUND OF THE INVENTION

1. Field of the Invention

This invention relates to methods for making a tubular annularly corrugated member, and to a method of manufacturing an energy absorbing tubular member having predictable collapsing characteristics when subjected to an axial compressive load.

2. Description of the Prior Art

Tubular members having axial collapsing characteristics are increasingly being employed as energy absorbing structural members, such as the steering column of modern automotive vehicles, to transmit torsional or axial force between components attached to opposite end sections.

When the impact of a collision or the like tends to throw the driver against the steering wheel or to produce rearward displacement of vehicle structure against the other end of such an energy absorbing steering column, resultant forces if sufficiently great will tend to collapse the column. The driver of the vehicle when thrown against the steering wheel will experience a cushioned deceleration as the energy of his momentum is absorbed in the work required to collapse the steering column. If forces against the lower end of the column cause it to collapse, the steering wheel will not be driven back against the driver, or will be driven back with lessened force, thus decreasing the chances of serious injury.

There have been relatively few economical manufacturing techniques developed heretofore for producing a tubular member having side walls which will collapse in a predictable pattern in reaction to a predetermined axial compressive force moving the ends of the tube walls toward one another. It is the broad purpose of the present invention to provide an improved method for producing a corrugated collapsible tube of this character which is readily adaptable to high production manufacturing processes, while at the same time producing a product having predictable energy-absorbing characteristics.

Further, in the manufacture of corrugated tubing generally, there have been no methods heretofore developed for economically and easily controlling the length and strength characteristics of the finished product due to wide variations in the characteristics of materials used.

SUMMARY OF THE INVENTION

In the preferred embodiment of the present invention, a selected section of a tubular blank for use as a vehicle steering column or other stress-subjectable corrugated tubular product is first deformed by the use of radially inwardly moving dies, by roll-forming, or by any other desired process, to provide a plurality of substantially equally spaced shallow annular depressions separated by slightly raised annular crowns, this deformation being a factor which will determine both the number and the volumes of convolutions to be formed in the second step.

The ends of the blank section are retained in press mandrels and the deformed section is axially compressed under a selected load so that the deformations fold in accordion fashion to form a plurality of annular and adjacent closed convolutions. The pressure necessary to close these convolutions, and the length of the section after closing, will be dependent on the material strength of the wall of the blank, so that the selected load and closed length will vary within predetermined limits.

Next, the convoluted section is stretched to partially unfold the convolutions, forming an annularly corrugated section, using a stretch pressure which will vary between minimum and maximum limits, and stretching the section to a finished length which will also vary between minimum and maximum limits, the actual stretch pressure and the actual finished length again being determined by the strength of the material. However, proper balancing of the stretch pressure and length variations will produce a finished product having a proper length with predetermined allowable tolerances and will be such that a predictable axial compressive force encountered in the event of a collision or the like will cause controlled collapse of the corrugated section, so that it can act predictably as an energy absorbing device for use as a vehicle steering column or the like. For any axial forces below that predicted, the column will be substantially rigid and capable of performing in its intended fashion as, for example, in steering the vehicle.

In a collision or the like, if the vehicle driver is thrown against the steering wheel with sufficient force, or if vehicle structure buckles to exert such forces against the lower end of the steering column, it will then collapse, the kinetic energy producing the collapse being absorbed in the work of deforming the corrugations as the tube ends approach one another. The rate at which the opposite tube ends move toward one another is related to the circumferential or hoop strains developed in the annular ridges of the corrugations.

In an optional method of forming, the blank is compressed further in the second step to flatten the annular walls of the adjacent convolutions against each other. Then, before stretching, a series of annularly spaced notches are cut across the outer periphery of the collapsed convolutions. The final tubular section after stretching then has a pattern of apertures in the partially unfolded corrugations which reduce the magnitude of the hoop stresses, depending on the depth and number of notches, thereby reducing the magnitude of the axial force required to initiate the collapsing movement. This step provides a means for additionally closely controlling the axial strength of the tube. The walls of the corrugations in this type of tube will take a more angular configuration than in the previously described embodiment. This method is described and claimed in the previously noted application Ser. No. 824,440, filed May 14, 1969, now U.S. Pat. No. 3,577,621 from which the present application was divided.

The preformed tubular blank may be deformed into a series of annular corrugations successively having gradually reduced major diameters. This can be done by spacing the preliminary depressions, formed in the first operation, successively closer from one end to the other. Thus, the corrugations of the finished tubular member will tend to collapse in a progressive pattern as distinguished from a random or uncontrolled pattern which would be the case with equally spaced corrugations.

It is therefore a general object of the present invention to provide a method for making a tubular product having a predictable collapsing characteristic by applying a compressive axial force to a tubular blank sufficient to move the opposite ends of the blank toward one another so that the tube wall collapses into a predetermined convoluted pattern and then applying a selected tensile axial force, within limits, to the collapsed blank so that the convoluted section is partially unfolded to a selected axial length within predetermined limits.

Further objects and advantages of the present invention will be apparent to one skilled in the art to which the invention pertains upon reference to the following detailed description.

DESCRIPTION OF THE DRAWINGS

A more complete understanding of the invention may be had by reference to the accompanying drawings illustrating preferred embodiments of the invention in which like reference characters refer to like parts throughout the several views and in which.

DESCRIPTION OF THE PREFERRED EMBODIMENTS

Figure 1:
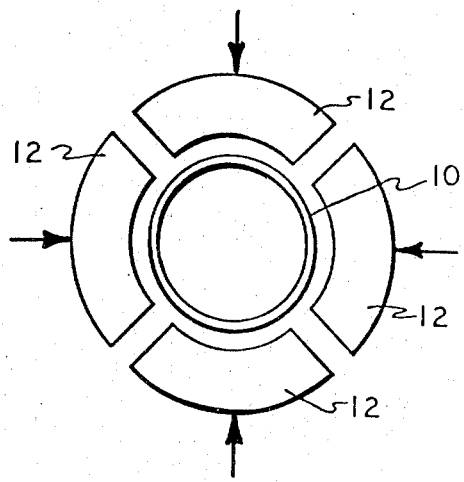
FIG. 1 is a diagrammatic cross-sectional view illustrating a preferred method of preforming a tubular blank.
Figure 2:
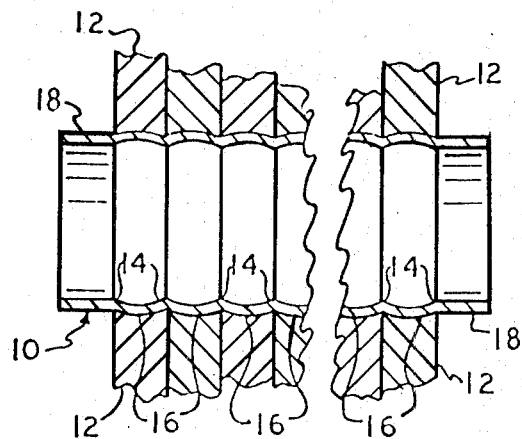
FIG. 2 is a longitudinal cross-sectional view illustrating the preforming operation.

Referring first to FIGS. 1 and 2, the preferred method of practicing the first step of the invention comprises peripherally deforming the side wall of a tubular metal blank 10 so that the subsequent application of an axial compressive force on the opposite ends of the blank will cause the blank 10 to collapse in a predetermined pattern. For purposes of illustration only, the preformed blank 10 is made by radially converging a set or sets of dies 12 thereon to simultaneously engage the outer wall surface and deform it into a continuous series of shallow annular depressions 14 substantially equally spaced by slightly raised annular crowns 16. Preferably the dies 12 deform the side walls of the blank 10 in a single stroke. The compressive force applied by the dies 12 is sufficient to deform the walls of the tube 10 as shown, but insufficient to produce any appreciable thinning or uneven metal forging of the tube walls. These depressions 14 and crowns 16 may be made by other desired methods, as for example roll-forming, hydrostatic forming, or the like.

The blank 10 is preferably left with undeformed end sections 18. The next step comprises applying, by means of press mandrels 20, an axial compression to the end sections 18 so that they are forced toward one another as indicated by the directional arrows of FIG. 3, causing the crowns 16 to radially enlarge as they fold about their major diameter and move axially toward one another until they abut to form the plurality of convolutions as shown, the convolutions having substantially equal volumes and depressions 14 forming similar inner diameter convolutions as shown.

Figure 4:
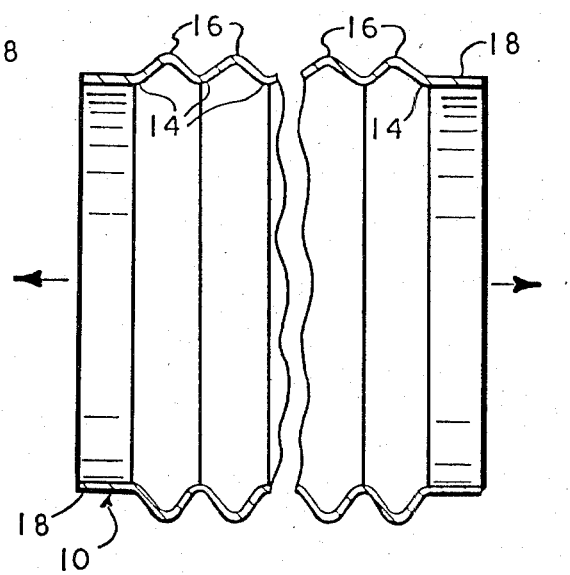
FIG. 4 is a longitudinal cross-sectional view illustrating the step of stretching and partially unfolding the convolutions to the finished corrugated length.

Next, as indicated in FIG. 4, a stretch pressure is applied to the opposite end sections 18 of the blank 10 so that they are pulled away from one another, partially unfolding the convolutions until they assume a predetermined corrugated configuration as shown.

The stretch pressure used to expand the blank to its finished form will be the determining factor in predetermining that force which will produce a controlled collapse if the column is later subjected to impacts from a collision or the like, and the way in which stretch pressure and length variations are balanced to minimize collapse load variations will be explained in relation to FIGS. 10 and 11.

Figure 5:
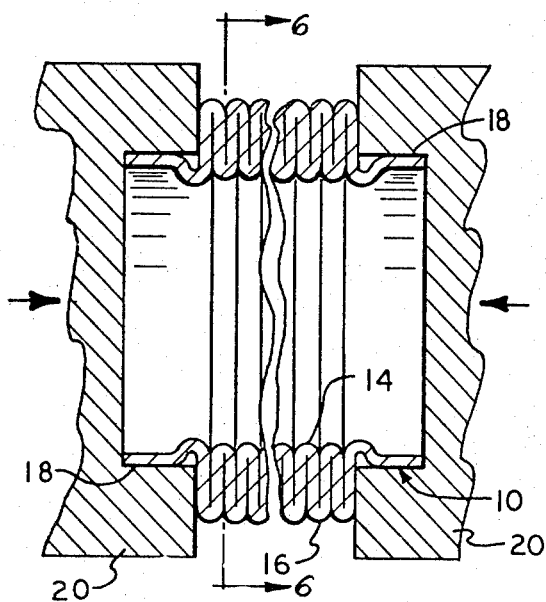
FIG. 5 is a longitudinal cross-sectional view illustrating an alternative step of fully collapsing the convolutions formed in the tubular blank.
Figure 6:
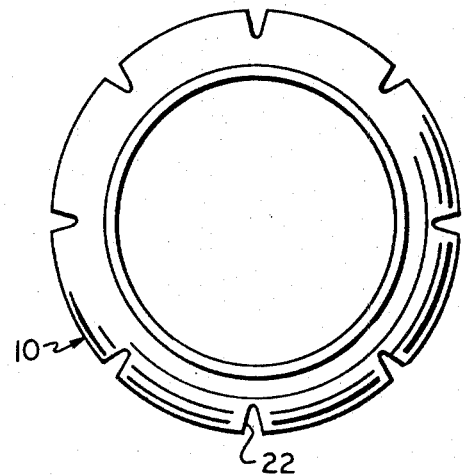
FIG. 6 is a cross-sectional view taken substantially on the line 6—6 of FIG. 5 and illustrating the collapsed tubular blank provided with a series of annularly spaced notches.
Figure 7:
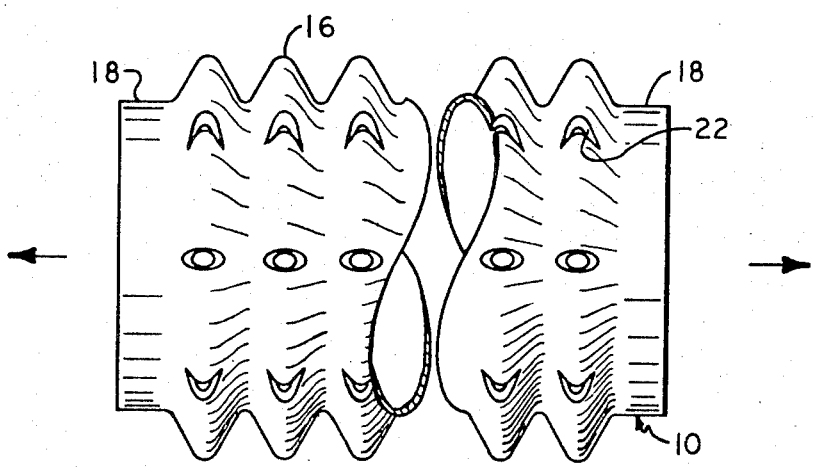
FIG. 7 is a longitudinal elevational view illustrating the tubular section of FIGS. 5 and 6 after stretching.

FIGS. 5, 6 and 7 illustrate an alternative method of practicing the invention to additionally control the magnitude of the hoop strains developed in each of the corrugations when the tubular member 10 is subjected to an axial collapsing force. As shown in FIG. 5, the convolutions formed from the crowns 16 are preferably completely collapsed by compressing of the press mandrels 20 until the adjacent convolute surfaces are in full face to face abutment and disposed substantially in a plane normal to the axis of the blank 10.

While the blank 10 is so compressed, a series of preferably equally annularly spaced notches 22 are cut across the outer peripheries of each convolution by any suitable cutting tool to a predetermined radial depth as shown in FIG. 6. The notches 22 provide a series of discontinuities in the convolutions which radially enlarge when the expanding stretch pressure is applied to the tube 10 in the final forming step. Thus, by carefully selecting the number of notches 22 and the depth to which they are cut, a further control over the predetermined force necessary to initiate collapse of the finished column is available.

The blank 10 is finally axially stretched and takes on a configuration substantially as shown in FIG. 7 to produce a finished column similar to that illustrated in FIG. 4, but with a carefully selected pattern of apertures provided in the corrugations, which in the present case are of a more angular nature.

Figure 8:
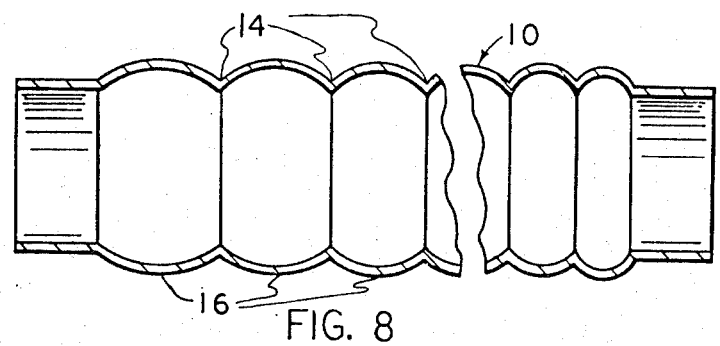
FIG. 8 is a longitudinal cross-sectional view showing a tubular blank initially deformed to provide progressively closer spaced depressions.
Figure 9:
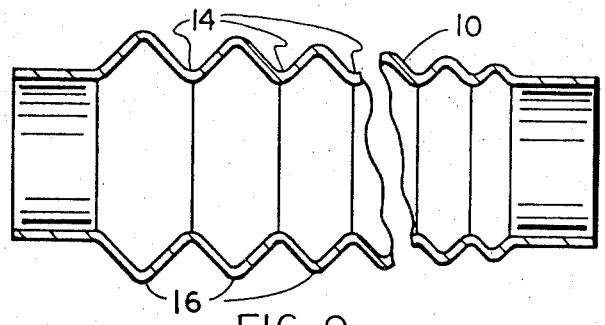
FIG. 9 is a longitudinal cross-sectional view showing the blank of FIG. 8 after compression and subsequent expansion to its final form.

FIG. 8 illustrates in exaggerated form another preferred method of preforming a blank 10 in which the shallow annular depressions 14 are spaced successively closer from left to right by forming progressively axially shorter raised crowns 16. After the compression and the expansion steps, the successive corrugations from left to right will consequently have progressively smaller volumes as seen in FIG. 9 and will vary in their resistance to collapse if later subjected to the axial forces resulting from impacts of collision or the like. In such event, the corrugations will collapse progressively from the relatively weaker corrugations on the left to the relatively stronger corrugations on the right. In actual practice, the difference in spacing of successive depressions will be very slight but for clarity the drawing illustrates rather radical successively diminishing spacings, and the depressions and intermediate crowns are of exaggerated radial dimensions.

Figure 3:
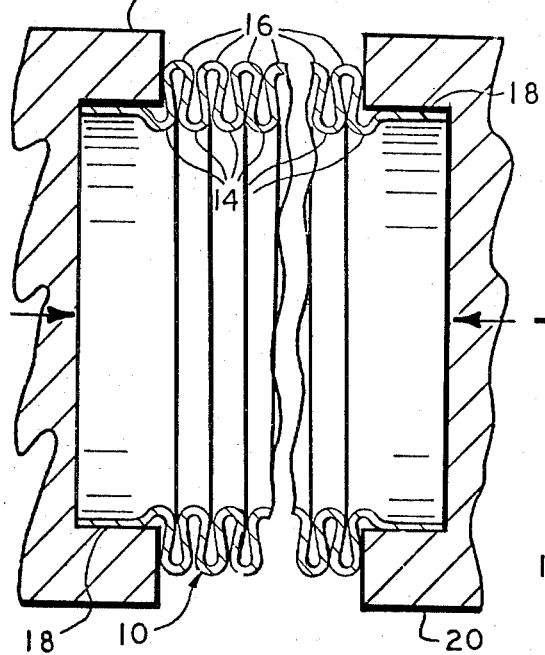
FIG. 3 is a longitudinal cross-sectional view illustrating the step of applying an axial compressive force to collapse the wall of the preformed tubular blank into a convoluted configuration.
Figure 10:
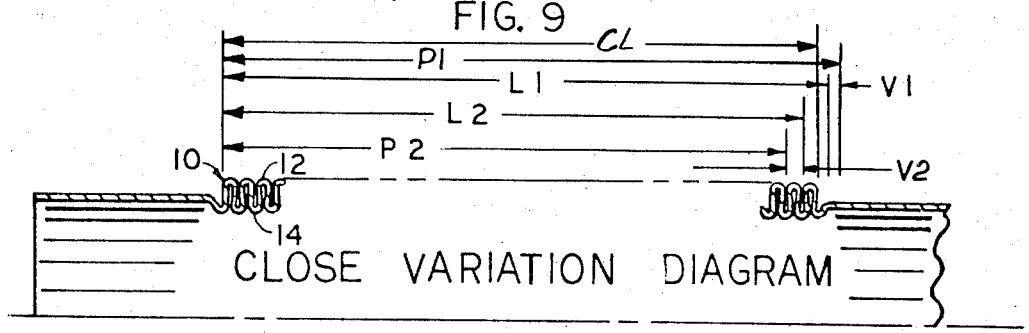
FIG. 10 is a close variation diagram for the collapsed tubular section.

FIG. 10 is a close variation diagram showing the compressed blank 10 of FIG. 3 made from a raw material which will be found to have variations in strength characteristics depending on variations in alloy composition as well as variations in thickness. In the illustration of FIG. 10:

$C_L$ is the center length relative to the left end of the compressed blank section to which a mean material would compress at a selected close pressure;

$P_1$ is the length to which the strongest material could be compressed at such selected close pressure;

$P_2$ is the length to which the weakest material could be compressed at such selected close pressure;

$L_1$ is the maximum length to which the strongest material will actually be compressed;

$L_2$ is the minimum length to which the weakest material will actually be compressed;

$V_1$ is the differential between the $P_1$ and $L_1$ lengths; and $V_2$ is the differential between the $P_2$ and $L_2$ lengths.

Figure 11:
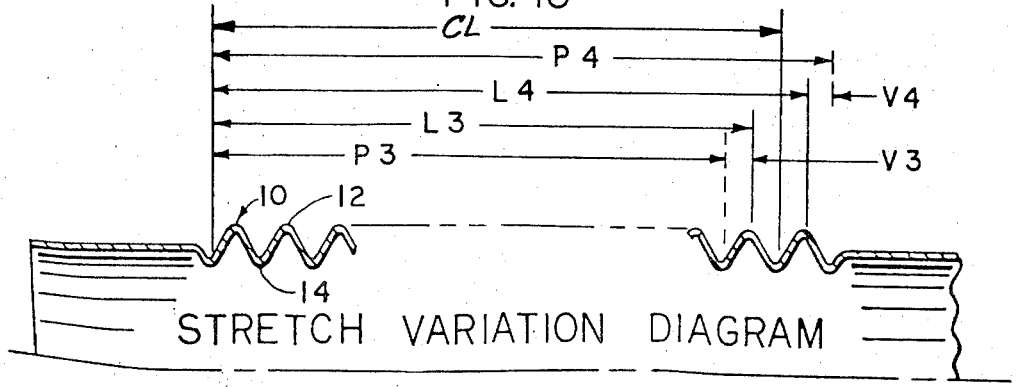
FIG. 11 is a stretch variation diagram for the expanded tubular section.

FIG. 11 is a stretch variation diagram showing the finally expanded blank 10 of FIG. 4 in which:

$C_L$ is the length relative to the left end of the expanded blank section to which a mean material would be expanded at a selected stretch pressure to predetermine the desired collapse load;

$P_3$ is the length to which the strongest material could be expanded at such selected stretch pressure;

$P_4$ is the length to which the weakest material could be expanded at such selected stretch pressure;

$L_3$ is the minimum length to which the strongest material will actually be expanded;

$L_4$ is the maximum length to which the weakest material will actually be expanded;

$V_3$ is the differential between the $P_3$ and $L_3$ lengths; and $V_4$ is the differential between the $P_4$ and $L_4$ lengths.

Since $L_3$ and $L_4$ are balanced about $C_1$, collapse load variations will thus be minimized.

It will be apparent that, to establish this desired collapse load as an inherent characteristic of the finished product, the close and stretch pressures will be determined on development over a full range of material variables, with the convoluted length variations chosen to compensate for the physical variations of different blank materials, thus minimizing collapse load variables.

Depending on the material used, the finished length of the blank can be predetermined within allowable tolerances, and that force which will be required to produce a controlled collapse of the column can be predetermined by proper selection of close and stretch pressures, within tolerable limits.

The above described system for determining pressures and lengths is an economical method for developing a tubular product to be used as a vehicle steering column with walls having a carefully controlled axial strength.

Although I have described only a few embodiments of my invention, it is to be understood that various changes and modifications can be made therein without departing from the spirit of the invention as expressed in the scope of the appended claims.

I claim:

1. A method for making a plurality of tubular blanks into a plurality of tubular members having a selected configuration wherein each tubular blank is made of a selected material wherein the strength of the material of each blank is variable within defined limits, such that each of the resulting tubular members is enabled to axially collapse when subjected to an axial compression load which is selected from a predetermined range, said method comprising the steps of:

a. preforming each of said tubular blanks to predetermine the number and volumes of to be formed annular convolutions on each of said blanks, b. next, axially compressing each of said blanks under a selected closing load within predetermined limits such that each of said blanks is compressed to a closed length within predetermined compressed length limits, said length limits being greater than the length that the weakest of said blanks can be compressed to at said selected closing load and less than the length that the strongest of said blanks can be compressed to at said selected closing load, to form a plurality of adjacent annular convolutions, and c. subsequently axially stretching each of said blanks with a selected stretch load within predetermined limits such that each of said blanks is stretched to an expanded length within predetermined expanded length limits, said expanded length limits being greater than the length that the strongest of said blanks can be stretched to at said selected stretch load and less than the length that the weakest of said blanks can be stretched to at said selected stretch load, to partially unfold the convolutions and thereby form a plurality of adjacent annular corrugations.

2. The method as defined in claim 1 wherein the step of preforming each of said tubular blanks comprises: forming on each of said blanks a plurality of axially spaced shallow annular depressions separated by slightly raised annular crowns, thereby defining the number and volumes of the subsequently formed corrugations.

3. The method as defined in claim 2 wherein the forming of said depressions and crowns is effected by converging preformed dies radially inward on said blanks.

4. The method as defined in claim 2 wherein the forming of said depressions and crowns is effected by roll-forming.

5. The method as defined in claim 2 wherein the forming of said depressions and crowns is effected by hydrostatic forming.

6. The method as defined in claim 2 wherein said depressions are equally spaced, whereby the subsequently formed corrugations will be of substantially equal volumes.

7. The method as defined in claim 2 wherein said depressions are unequally spaced, whereby the subsequently formed corrugations will be of different volumes.

8. The method as defined in claim 4 wherein said depressions are successively lesser spaced from one end to the other end of each of said blanks, whereby the subsequently formed corrugations will be of successively lesser volumes from one end to the other of the tubular members.

9. The method defined in claim 1 wherein said compressing step comprises applying a load sufficient to flatten said convolutions, whereby subsequently formed corrugations will meet at annular substantially sharp angles.

* * * * *